United States Patent
Park et al.

(10) Patent No.: US 8,908,583 B2
(45) Date of Patent: Dec. 9, 2014

(54) METHOD AND DEVICE FOR ALLOCATING RESOURCES IN WIRELESS COMMUNICATION SYSTEM

(75) Inventors: Gi Won Park, Anyang-si (KR); In Uk Jung, Anyang-si (KR); Young Soo Yuk, Anyang-si (KR); Jin Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 179 days.

(21) Appl. No.: 13/642,844

(22) PCT Filed: Apr. 22, 2011

(86) PCT No.: PCT/KR2011/002917
§ 371 (c)(1),
(2), (4) Date: Oct. 22, 2012

(87) PCT Pub. No.: WO2011/132982
PCT Pub. Date: Oct. 27, 2011

(65) Prior Publication Data
US 2013/0039246 A1    Feb. 14, 2013

Related U.S. Application Data

(60) Provisional application No. 61/327,079, filed on Apr. 22, 2010.

(51) Int. Cl.
*H04W 72/04* (2009.01)
*H04W 52/02* (2009.01)

(52) U.S. Cl.
CPC .......... *H04W 72/04* (2013.01); *H04W 52/0216* (2013.01)
USPC ............ 370/311; 370/329; 370/219; 370/222

(58) Field of Classification Search
None
See application file for complete search history.

(56) References Cited

U.S. PATENT DOCUMENTS

| | | | | |
|---|---|---|---|---|
| 5,838,720 | A * | 11/1998 | Morelli | 375/219 |
| 6,628,972 | B1 * | 9/2003 | Lee | 455/574 |
| 7,424,315 | B2 * | 9/2008 | Heuts et al. | 455/574 |
| 7,502,635 | B1 * | 3/2009 | Horikoshi et al. | 455/574 |
| 7,610,500 | B2 * | 10/2009 | Cherukuri et al. | 713/320 |
| 8,259,662 | B2 * | 9/2012 | Smith et al. | 370/329 |
| 8,265,016 | B2 * | 9/2012 | Xu | 370/329 |
| 8,423,856 | B2 * | 4/2013 | Cai | 714/748 |
| 2008/0101286 | A1 * | 5/2008 | Wang et al. | 370/329 |
| 2008/0117891 | A1 * | 5/2008 | Damnjanovic et al. | 370/345 |
| 2009/0245194 | A1 * | 10/2009 | Damnjanovic et al. | 370/329 |

(Continued)

OTHER PUBLICATIONS

Wei Ye et al., Feb. 2002, IEEE INFOCOM, 0-7803-7476, pp. 1567-1576.*

(Continued)

*Primary Examiner* — Ian N Moore
*Assistant Examiner* — Lakeram Jangbahadur
(74) *Attorney, Agent, or Firm* — Lee, Hong, Degerman, Kang & Waimey

(57) ABSTRACT

A method of allocating resources in a wireless communication system is provided. A wireless device which makes a transition between Low Power Consumption (LPC) mode and active mode receives, from a base station, an allocation message for allocating persistent scheduling resources used in persistent scheduling. The wireless device communicates with the base station using the persistent scheduling resources, for active duration in which the wireless device operates in the active mode. The wireless device deallocates the persistent scheduling resources automatically when the active duration is finished.

12 Claims, 8 Drawing Sheets

(56) References Cited

U.S. PATENT DOCUMENTS

| | | | |
|---|---|---|---|
| 2009/0247174 A1* | 10/2009 | Zhang et al. | 455/450 |
| 2009/0279488 A1* | 11/2009 | Zheng et al. | 370/329 |
| 2010/0091728 A1* | 4/2010 | Kim et al. | 370/329 |
| 2010/0172313 A1* | 7/2010 | Ho et al. | 370/329 |
| 2012/0155416 A1* | 6/2012 | Zhang et al. | 370/329 |
| 2013/0010730 A1* | 1/2013 | Wu et al. | 370/329 |
| 2013/0028227 A1* | 1/2013 | Kim et al. | 370/329 |
| 2013/0070707 A1* | 3/2013 | Cai et al. | 370/329 |
| 2013/0343252 A1* | 12/2013 | Chakraborty et al. | 370/311 |

OTHER PUBLICATIONS

Wei Ye et al., "An energy-efficient MAC protocol for wireless sensor networks," IEEE INFOCOM, vol. 3, pp. 1567-1576, 2002.

* cited by examiner

METHOD AND DEVICE FOR ALLOCATING RESOURCES IN WIRELESS COMMUNICATION SYSTEM

CROSS-REFERENCE TO RELATED APPLICATIONS

This application is the National Stage filing under 35 U.S.C. 371 of International Application No. PCT/ KR2011/002917, filed on Apr. 22, 2011, which claims the benefit of U.S. Provisional Application Ser. No. 61/327,079, filed on Apr. 22, 2010, the contents of which are all incorporated by reference herein in their entirety.

TECHNICAL FIELD

The present invention relates to wireless communication and, more specifically, to a method and apparatus for allocating or deallocating resources in a wireless communication system.

BACKGROUND ART

With the development of wireless communication technology, various types of wireless communication systems not common communication between a user and a base station are appearing.

Machine Type Communication (MTC) is one type of data communication including one or more entities that do not require an interaction with a human being. MTC refers to a concept in which not a Mobile Station (MS) used by a human being, but a machine apparatus performs communication over a network.

A machine apparatus used in MTC is called an MTC device. The MTC device includes a vending machine, an electricity meter, and a machine for controlling the water level of a dam.

The features of an MTC device are different from those of a common MS. First, the number of MTC devices covered by a Base Station (BS) is much larger than the number of MSs. The number of MTC devices may be several hundreds to several thousands. Second, the amount of data transmitted by an MTC device and the amount of data received by an MTC device are smaller than the amount of data of an MS. Furthermore, the type of transmitted and received data is also limited.

There is a need for a scheme for allocating resources and deallocating allocated resources for an MTC device.

DISCLOSURE

Technical Problem

The present invention provides a method and apparatus for allocating resources for persistent scheduling.

Furthermore, the present invention provides a method and apparatus for allocating resources for MTC.

Technical Solution

In an aspect, a method of allocating resources in a wireless communication system is provided. The method comprises receiving, by a wireless device from a base station, an allocation message for allocating persistent scheduling resources used in persistent scheduling, the wireless device making a transition between Low Power Consumption (LPC) mode and active mode, communicating with the base station, by the wireless device, using the persistent scheduling resources, for active duration in which the wireless device operates in the active mode, and deallocating the persistent scheduling resources automatically when the active duration is finished.

The wireless device may be a Machine Type Communication (MTC) device for MTC.

The persistent scheduling resources may include information about an allocation period indicating a period of the persistent scheduling.

The allocation message may further include information indicating a period in which the persistent scheduling resources are valid within the active duration.

In another aspect, a wireless device for allocating resources in a wireless communication system is provided. The wireless device comprises a Radio Frequency (RF) unit configured to transmit and receive radio signals, and a processor connected to the RF unit and configured to make a transition between Low Power Consumption (LPC) mode and active mode, wherein the processor receives an allocation message for allocating persistent scheduling resources used in persistent scheduling from a base station, communicates with the base station using the persistent scheduling resources, for active duration in which the processor operates in the active mode, and deallocates the persistent scheduling resources automatically when the active duration is finished.

Advantageous Effects

The autonomous allocation and/or autonomous deallocation of persistent scheduling resources are previously negotiated between an MTC device and a BS, and persistent scheduling resources are automatically allocated or automatically deallocated. Accordingly, signaling according to resource allocation/deallocation can be reduced.

MODE FOR INVENTION

Machine Type Communication (MTC) is one type of data communication including one or more entities that do not require an interaction with a human being.

An MTC device refers to a device that is used in MTC, and it is also called a Machine-to-Machine (M2M) device. An MTC device is a wireless device for transmitting or receiving data through a radio channel.

An MTC subscriber is an entity which has a contractual relation with a network operator in order to provide service to one or more MTC devices.

An MTC group refers to a group of MTC devices which share one or more MTC features and belong to the same MTC subscriber.

Figure 1:
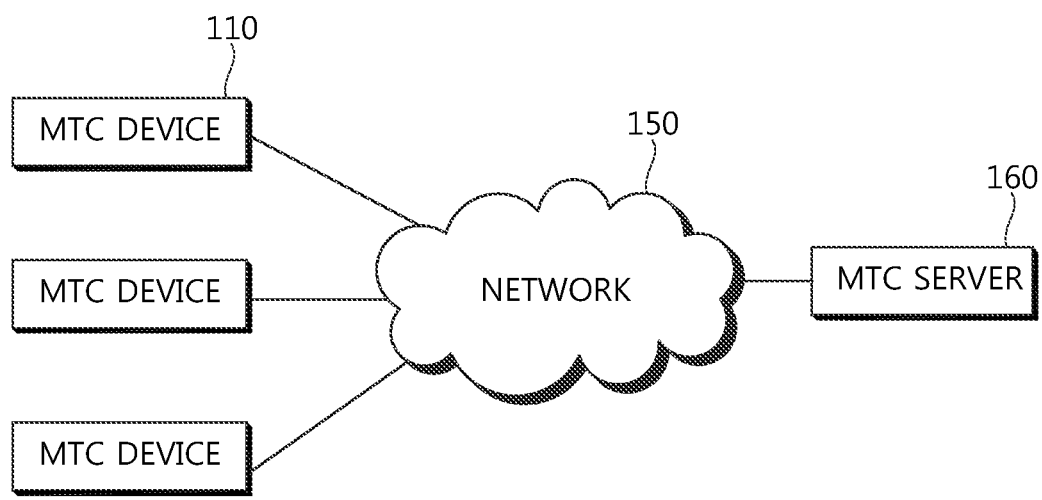
FIG. 1 is an example of a communication scenario for MTC.

FIG. 1 is an example of a communication scenario for MTC.

A plurality of MTC devices 110 is connected to an MTC server 160 over a network 150. The MTC server 160 receives information from the MTC devices 110 and provides the information to MTC users over the network 150.

The network 150 may be based on well-known Radio Access Technology (RAT), such as a GSM/EDGE Radio Access Network (GERAN), a UMTS Terrestrial Radio Access Network (UTRAN), or an Evolved-UTRAN (E-UTRAN). A Base Station (BS) is part of the network 150.

The MTC server 160 may be directly connected to the network 150, but may be connected to the network 150 through an Internet Protocol (IP).

Hereinafter, uplink (UL) means communication from the MTC device 110 to the BS, and downlink (DL) means communication from the BS to the MTC device 110.

In general, in order for an Mobile Station (MS) to transmit UL data to the BS, (1) the step of the MS requesting radio resources necessary to transmit UL data from the BS, (2) the step of the BS allocating radio resources in response to the request of the radio resources, (3) the step of the MS transmitting the UL data to the BS using the allocated radio resources are included. This is called dynamic scheduling.

Persistent scheduling means that an MS transmits UL data to a BS on a predetermined time or receives DL data on a predetermined time. For persistent scheduling, a BS first activates persistent allocation. When the persistent allocation is allocated, an MS transmits or receives data using resources predetermined by the persistent allocation.

In accordance with Institute of Electrical and Electronics Engineers (IEEE) P802.16m/D5 "Part 16: Air Interface for Broadband Wireless Access Systems" (hereinafter referred to as 802.16m) that was notified on April 2010, a DL Persistent Allocation (PA) Advanced-MAP (A-MAP) Information Element (IE) is used for DL persistent allocation and a UL PA A-MAP IE is used for UL persistent allocation.

Although a description is hereinafter given based on the IEEE 802.16m standard, those skilled in the art can readily apply the technical spirit of the present invention to other mobile communication systems or a smart grid.

Figure 2:
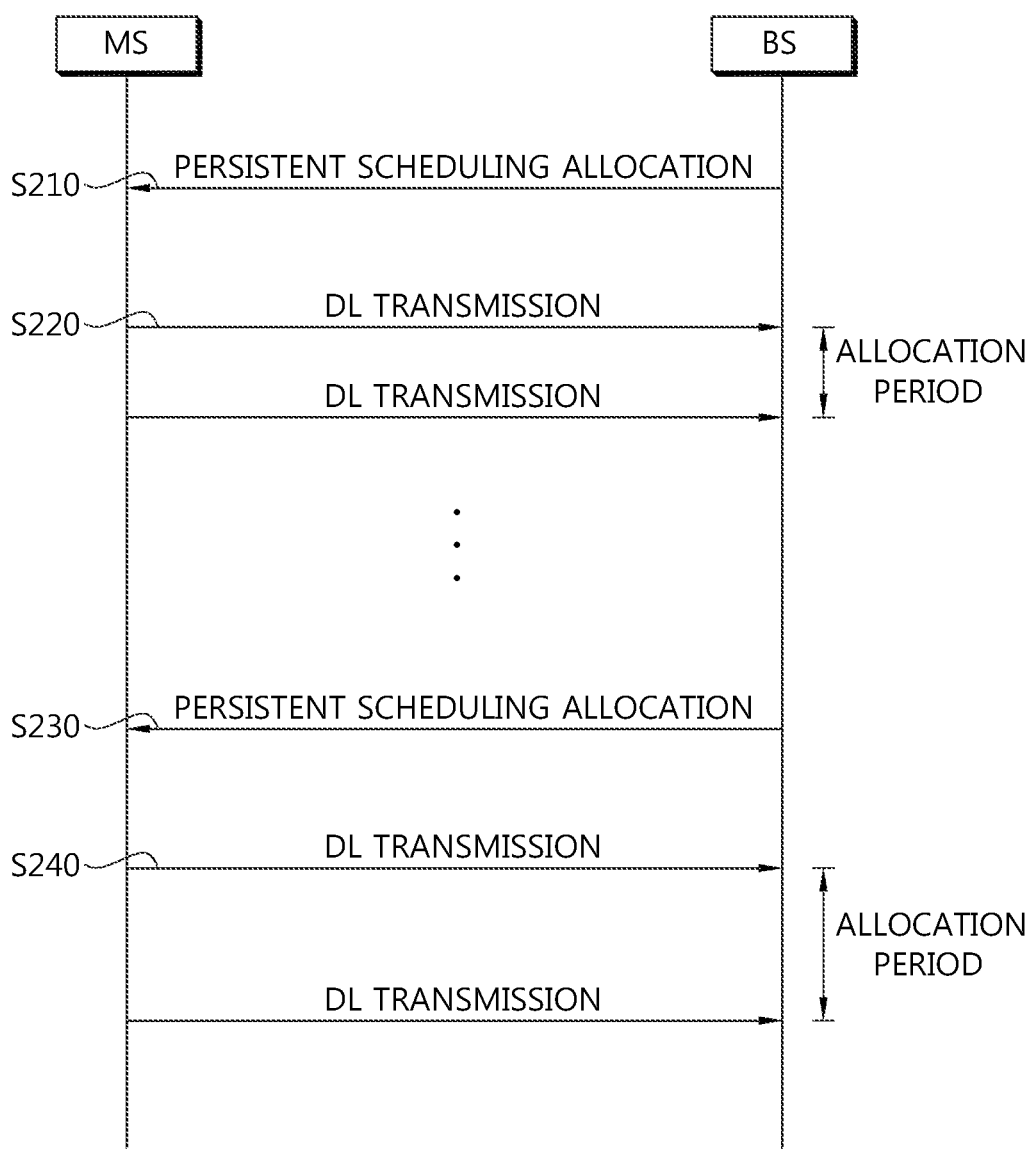
FIG. 2 is a flowchart illustrating a conventional persistent scheduling method.

FIG. 2 is a flowchart illustrating a conventional persistent scheduling method.

A BS allocates persistent scheduling to an MS (S210). It is assumed that the persistent scheduling allocation includes resources and an allocation period for DL data transmission. The allocation period may be called a period in which the DL data is transmitted.

The MS receives DL data based on the persistent scheduling allocation (S220). The MS receives DL data for every allocation period.

If the allocation period is changed, the BS transmits new persistent scheduling allocation, including a changed allocation period, to the MS (S230). The MS receives DL data based on the new persistent scheduling allocation (S240).

MTC applications include smart metering, tracking & tracing, public safety, etc. Accordingly, MTC devices periodically perform data communication on predetermined times. This is called a time-controlled transmission feature.

Persistent scheduling is used as a method of allocating resources to an MTC device by taking this MTC feature into account.

Figure 3:
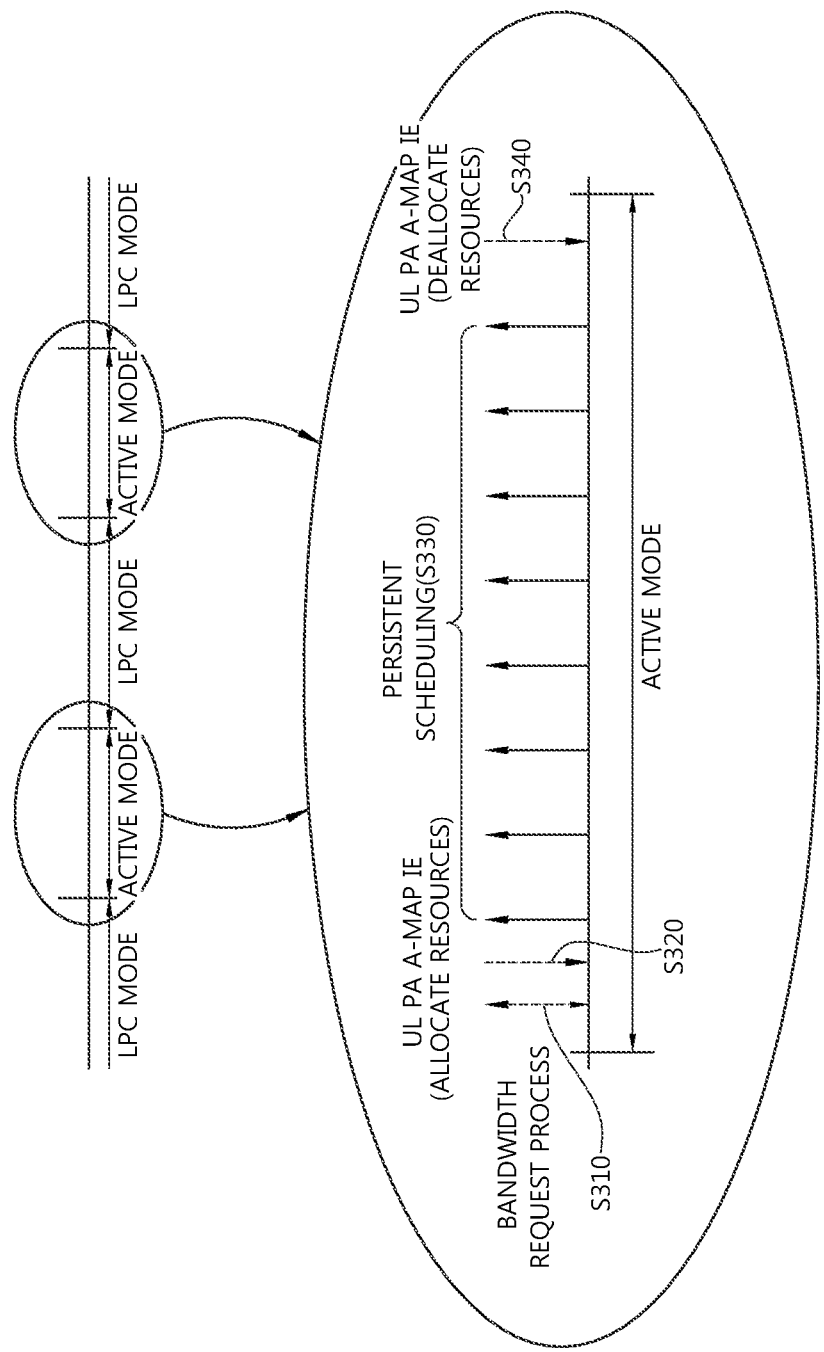
FIG. 3 shows the operation of a conventional MTC device.

FIG. 3 shows the operation of a conventional MTC device.

An MTC device makes the transition between Low Power Consumption (LPC) mode and active mode. A power-saving period includes LPC duration and an active duration. The LPC duration is duration in which the MTC device is in LPC mode. The active duration is duration in which the MTC device is in active mode.

In LPC mode, the MTC device does not perform data transmission, but performs a minimum operation, such as measurement or paging reception.

In active mode, the MTC device can receive and transmit data. The active duration is duration that is previously determined so that communication between the MTC device and a BS is performed.

In the active duration, the MTC device requests UL resource allocation through a bandwidth request process (S310). The bandwidth request is a process of requesting UL resource allocation in the IEEE 802.16m.

The BS sends UL resource allocation to the MTC device using the UL PA A-MAP IE (S320).

The MTC device sends UL data to the BS according to persistent scheduling (S330).

When the active duration is finished, the BS sends the UL PA A-MAP IE to the MTC device again in order to deallocate the UL resources allocated for persistent scheduling (S340).

The MTC device periodically makes the transition between LPC mode and active mode. When resource allocation and resource deallocation are repeated for every active duration, the UL PA A-MAP IE needs to be transmitted at least twice, thereby being capable of increasing signaling overhead.

Figure 4:
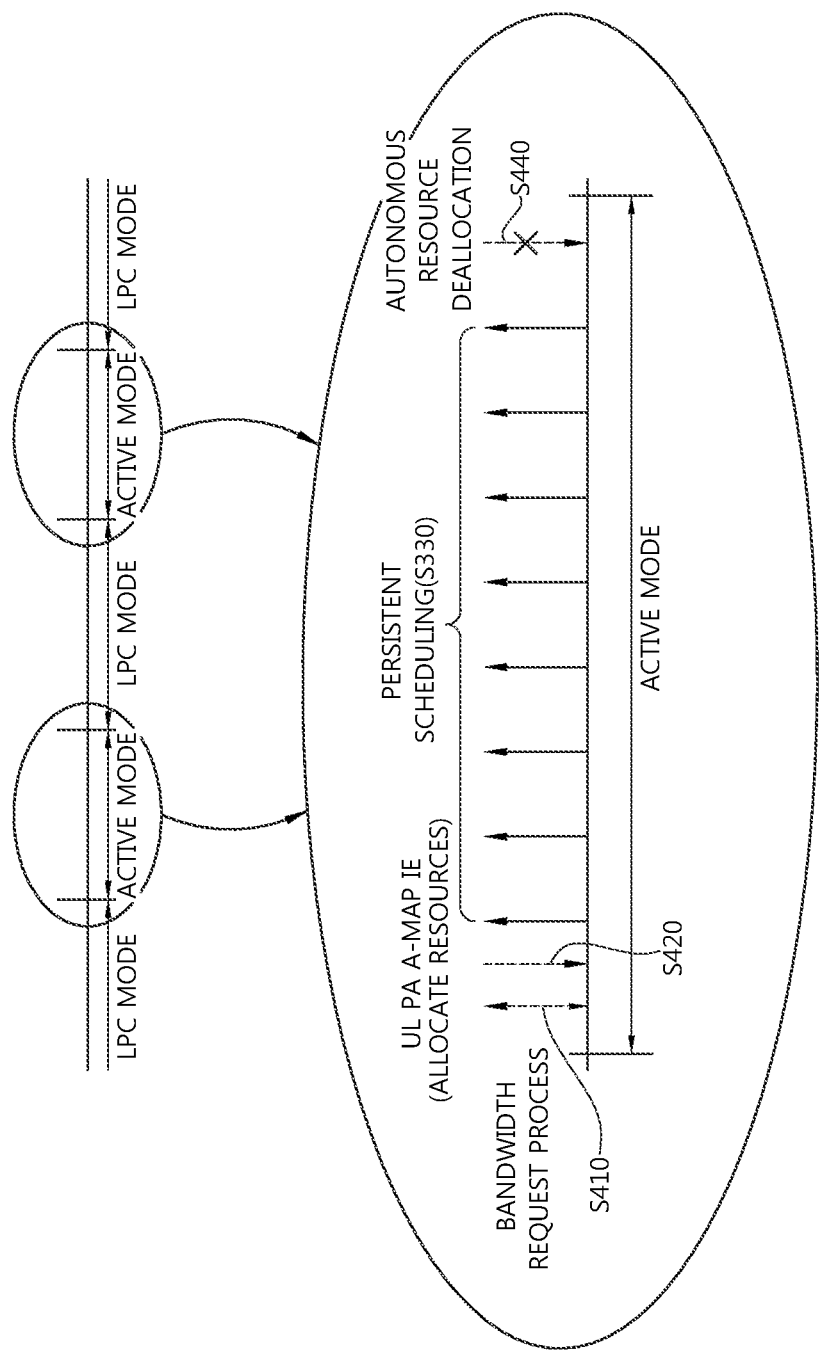
FIG. 4 is a schematic diagram showing a method of allocating resources in accordance with an embodiment of the present invention.

FIG. 4 is a schematic diagram showing a method of allocating resources in accordance with an embodiment of the present invention.

An MTC device makes the transition between LPC mode and active mode. In active duration, the MTC device requests UL resource allocation through a bandwidth request process (S410). A BS sends UL resource allocation to the MTC device using the UL PA A-MAP IE (S420). The MTC device sends UL data to the BS according to persistent scheduling (S430).

When the active duration is finished, the BS and the MTC device automatically deallocate the resources used for the persistent scheduling. The deallocated resources may be used for other wireless devices.

Figure 5:
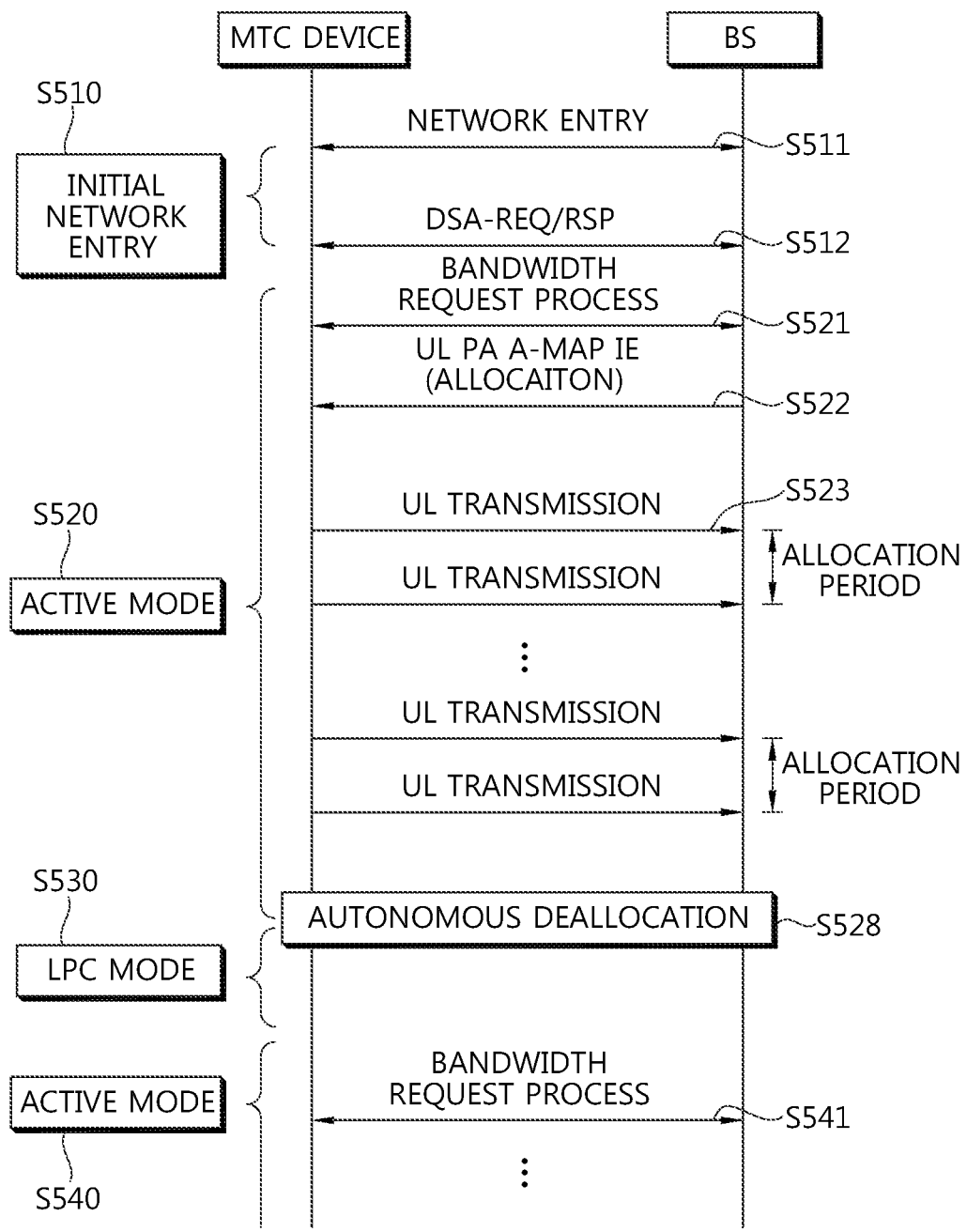
FIG. 5 is a flowchart illustrating a method of allocating resources in accordance with an embodiment of the present invention.

FIG. 5 is a flowchart illustrating a method of allocating resources in accordance with an embodiment of the present invention.

An initial network entry at step S510 is a process of an MTC device accessing a BS and performing registration. At step S511, the MTC device performs entry into the BS and the network. The network entry includes scanning into a DL channel, synchronization setting with the BS, and a procedure of calculating a transmission parameter for DL/UL.

At step S512, the MTC device generates a persistent service flow through a Dynamic Service Addition (DSA) procedure with the BS and negotiates a persistent allocation type. The DSA procedure is performed in exchange of DSA-REQ/RSP messages.

The DSA-REQ/RSP message used in the DSA procedure between the BS and the MTC device may include parameters, such as those listed in Table below.

TABLE 1

| Syntax | Size (bit) | Description |
|---|---|---|
| Persistent allocation support | 1 | 0: does not support persistent allocation<br>1: support persistent allocation |
| If(Persistent allocation support == 1){ | | |
| Persistent allocation operation | 2 | 0b00: allocation and deallocation through PA A-MAP IE<br>0b01: allocation through PA A-MAP IE and autonomous deallocation<br>0b10: autonomous allocation and autonomous deallocation<br>0b11: reserved |
| } | | |

'Persistent allocation support' is a persistent allocation support parameter indicating whether an MTC device and/or a BS support persistent scheduling allocation or not.

'Persistent allocation operation' is a persistent allocation operation parameter indicating whether an MTC device and/or a BS support autonomous allocation and/or autonomous deallocation for resources allocated by persistent scheduling or not.

If the value of the persistent allocation support parameter is set to '1' and the value of the persistent allocation operation parameter is set to '0b01', a BS automatically deallocates resources, allocated for persistent allocation, at a point of time at which active duration is finished.

The parameters of Table 1 may be included in AAI_REG-REQ/RSP messages or AAI_SBC-REQ/RSP messages which are used in a basic capability negotiation procedure. That is, the persistent scheduling allocation and persistent allocation operations may be negotiated in the basic capability negotiation procedure.

It is hereinafter assumed that both an MTC device and a BS support persistent scheduling, which is set to autonomous deallocation. That is, the value of the persistent allocation support parameter is set to '1', and the value of the persistent allocation operation parameter is set to '0b01'.

In active mode at step S520, the MTC device performs UL transmission and automatically deallocates the resources.

At step S521, the MTC device and the BS perform a bandwidth request process. That is, the MTC device requests UL resource allocation from the BS.

At step S522, the BS sends the UL PA A-MAP IE for allocating UL resources for persistent scheduling to the MTC device. At step S523, the MTC device performs UL transmission based on the allocated persistent scheduling resources (S523).

At step S528, when the active duration is finished, the MTC device automatically deallocates the persistent scheduling resources. That is, when active mode makes a transition to LPC mode, the MTC device automatically deallocates the persistent scheduling resources.

In LPC mode at step S530, the MTC device does not communicate with the BS.

If UL transmission is necessary in active duration after step S540, the MTC device and the BS perform a bandwidth request process (S541) again and may perform the above-described UL resource allocation and autonomous deallocation.

Although UL resource allocation and UL transmission have been described in connection with the embodiments, those skilled in the art can readily apply the technical spirit of the present invention to DL resource allocation and DL transmission.

Meanwhile, the persistent allocation operation parameter may be transmitted from the BS to the MTC device in the step of allocating resources not the network entry process.

Table 2 below shows an example of parameters included in the DL PA A-MAP IE.

TABLE 2

| Syntax | Size (bit) | Description |
|---|---|---|
| DL PA A-MAP IE Format(){ | | |
| A-MAP IE Type | 4 | DL PA A-MAP IE |
| ~ | | |
| Persistent allocation operation | 2 | 0b00: allocation and deallocation through PA A-MAP IE<br>0b01: allocation through PA A-MAP IE and autonomous deallocation<br>0b10: autonomous allocation and autonomous deallocation<br>0b11: reserved |
| Group ID | | Identifier indicating an MTC group to which persistent scheduling resources are allocated |
| } | | |

Table 3 below shows an example of parameters included in the UL PA A-MAP IE.

TABLE 3

| Syntax | Size (bit) | Description |
|---|---|---|
| UL PA A-MAP IE Format(){ | | |
| A-MAP IE Type | 4 | UL PA A-MAP IE |
| ~ | | |
| Persistent allocation operation | 2 | 0b00: allocation and deallocation through PA A-MAP IE<br>0b01: allocation through PA A-MAP IE and autonomous deallocation<br>0b10: autonomous allocation and autonomous deallocation<br>0b11: reserved |
| UL PA offset | | Time offset allocated to an MTC group for active duration |
| Group ID | | Identifier indicating an MTC group to which persistent scheduling resources are allocated |
| } | | |

The UL PA offset is a time offset that is allocated in order to avoid a collision due to simultaneous UL transmission between MTC devices for active duration.

A plurality of MTC devices or a plurality of MTC groups may be deployed in one BS. If a plurality of MTC groups performs UL transmission for active duration, that is, a relatively short period, at the same time, a transmission collision may occur. Accordingly, a UL PA offset is allocated to each of the MTC groups (or each MTC device) so that UL transmission is performed at a different point of time within the active duration.

A group ID means an MTC group to which resources are allocated. An MTC device can identify whether resources are allocated to its own group or not by checking a group ID.

Figure 6:
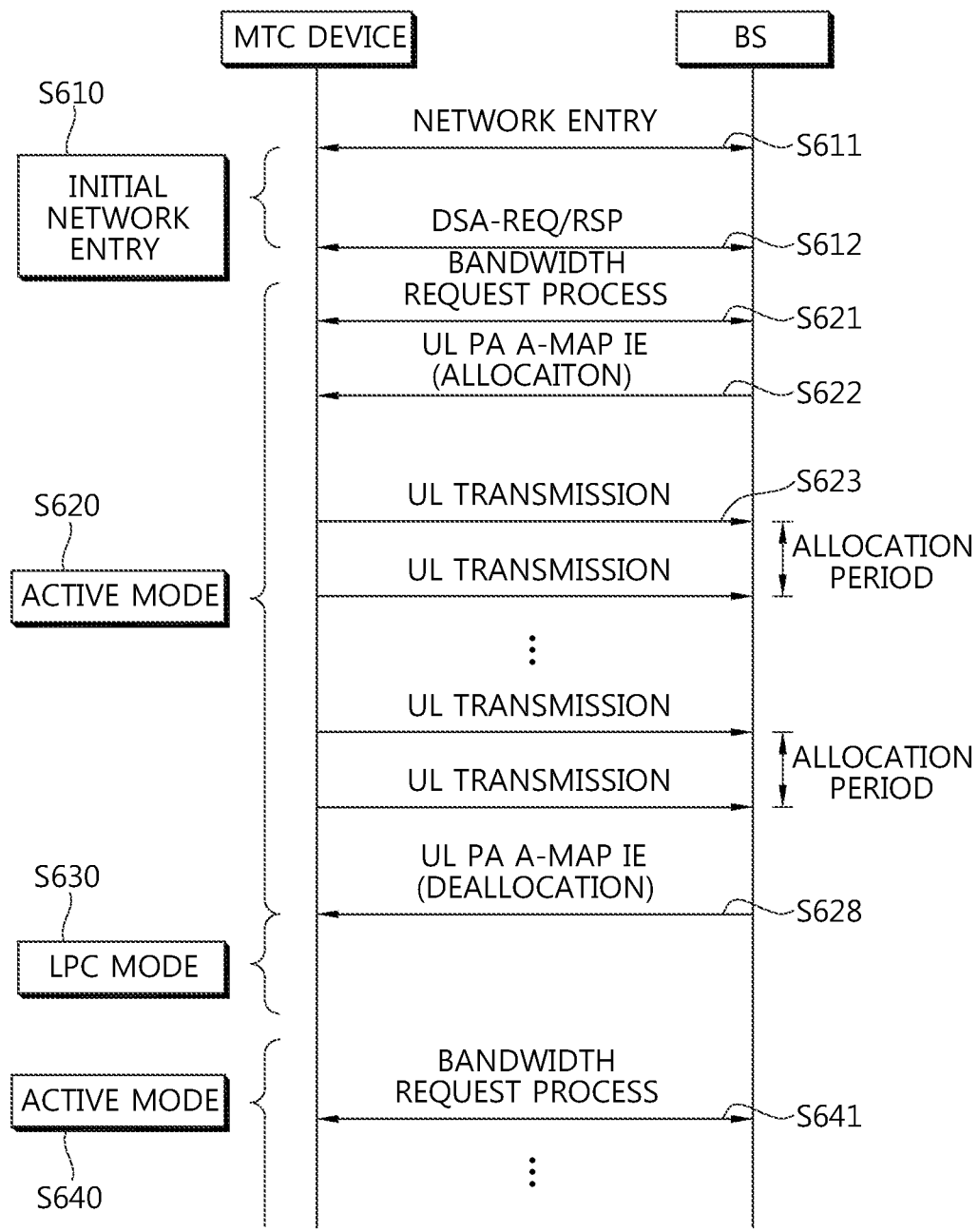
FIG. 6 is a flowchart illustrating a method of allocating resources in accordance with an embodiment of the present invention.

FIG. 6 is a flowchart illustrating a method of allocating resources in accordance with an embodiment of the present invention.

Step S611 to step S623 are identical with step S511 to step S523 of FIG. 5. Here, both an MTC device and a BS support persistent scheduling, and autonomous deallocation is not set. That is, the value of the persistent allocation support parameter is set to '1', and the value of the persistent allocation operation parameter is set to '0b00'.

Accordingly, at step S628, the MTC device receives the UL PA A-MAP IE indicative of resource deallocation and then deallocates allocated persistent scheduling resources.

Figure 7:
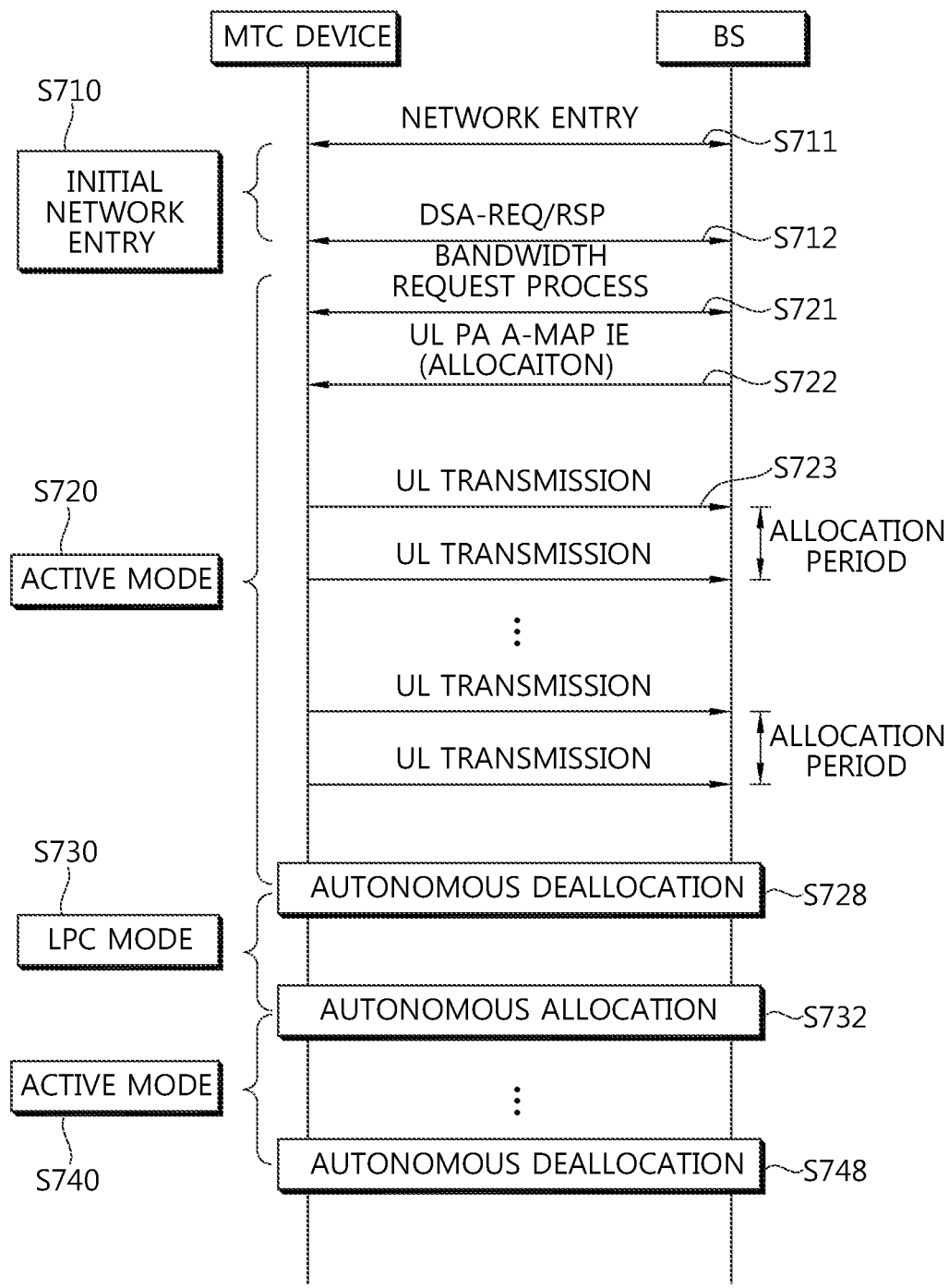
FIG. 7 is a flowchart illustrating a method of allocating resources in accordance with an embodiment of the present invention.

FIG. 7 is a flowchart illustrating a method of allocating resources in accordance with an embodiment of the present invention.

Step S711 to step S723 are identical with step S511 to step S523 of FIG. 5. Here, both an MTC device and a BS support persistent scheduling, and autonomous allocation and autonomous deallocation are set. That is, the value of the persistent allocation support parameter is set to '1', and the value of the persistent allocation operation parameter is set to '0b10'.

At step S728, when the active duration is finished, the MTC device automatically deallocate the persistent scheduling resources. That is, when active mode switches to LPC mode, the MTC device automatically deallocates the persistent scheduling resources In LPC mode at step S730, the BS may allocate the persistent scheduling resources to another wireless device or may use the persistent scheduling resources.

At step S732, when active duration is started, the MTC device automatically allocates persistent scheduling resources. Next, at step S748, when the active duration is finished, the MTC device automatically deallocates the persistent scheduling resources.

Meanwhile, the proposed persistent allocation operation parameter may be transmitted to the MTC device through the UL/DL PA A-MAP IE in the step of allocating resources not the network entry process.

Table 4 below shows an example of parameters included in the UL PA A-MAP IE.

TABLE 4

| Syntax | Size (bit) | Description |
| --- | --- | --- |
| UL PA A-MAP IE Format( ){ | | |
| A-MAP IE Type | 4 | UL PA A-MAP IE |
| ~ | | |
| Persistent allocation operation | 2 | 0b00: allocation and deallocation through PA A-MAP IE<br>0b01: allocation through PA A-MAP IE and autonomous deallocation<br>0b10: autonomous allocation and autonomous deallocation<br>0b11: reserved |
| UL offset | | Time offset until UL transmission is performed after active mode is started |
| UL duration | | Duration in which an MTC device performs UL transmission after UL transmission is started |
| Group ID | | Identifier indicating an MTC group to which persistent scheduling resources are allocated |
| } | | |

An MTC device can know when it can start UL transmission within active duration using an UL offset. An MTC device can know whether it can perform UL transmission how long within active duration using UL duration.

Duration indicated by the UL offset and the UL duration is called a valid period. The valid period is a period in which an MTC device (or an MTC group) can perform UL transmission within active duration. Or, the valid period may be called a period in which communication between an MTC device and a BS can be performed using allocated persistent scheduling resources.

Although UL persistent scheduling has been illustrated in connection with the above-described embodiments, those skilled in the art can readily apply the technical spirit of the present invention to DL persistent scheduling.

The names and sizes of the parameters shown in the tables in the above-described embodiments are only illustrative and are not limiting factors.

In accordance with the proposed invention, the autonomous allocation and/or autonomous deallocation of persistent scheduling are previously negotiated between an MTC device and a BS, and resources used in persistent scheduling are automatically allocated or automatically deallocated. Accordingly, signaling according to resource allocation/deallocation can be reduced.

Figure 8:
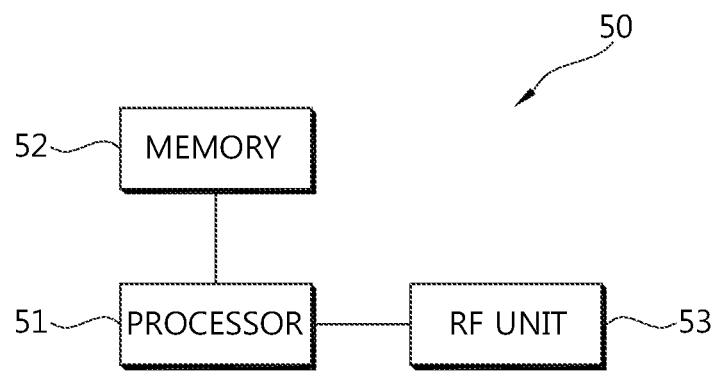
FIG. 8 is a block diagram illustrating a wireless device in which the embodiments of the present invention are embodied.

FIG. 8 is a block diagram illustrating a wireless device in which the embodiments of the present invention are embodied.

The wireless device 50 includes a processor 51, memory 52, and a Radio Frequency (RF) unit 53. The memory 52 is connected to the processor 51, and it stores various pieces of information for driving the processor 51. The RF unit 53 is connected to the processor 51, and it transmits and/or receives radio signals.

The processor 51 implements the proposed functions, processes and/or methods. In the embodiments of FIGS. 5 to 7, the operations of the MTC device can be embodied by the processor 51.

The processor may include Application-Specific Integrated Circuits (ASICs), other chipsets, logic circuits and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is embodied in software, the above-described scheme may be embodied using a module (process or function) that performs the above function. The module may be stored in the memory and executed by the processor. The memory may be placed inside or outside the processor and connected to the processor using a variety of well-known means.

In the above exemplary systems, although the methods have been described on the basis of the flowcharts using a series of the steps or blocks, the present invention is not limited to order of the steps, and some of the steps may be performed at different order from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method of allocating resources in a wireless communication system, comprising:
   entering, by a wireless device, into a base station by performing a downlink channel scanning and an uplink channel scanning, a synchronization with the base station, and a procedure of calculating a transmission parameter for a downlink channel and an uplink channel;
   generating, by the wireless device, a persistent service flow through a dynamic service addition (DSA) procedure, wherein the DSA procedure is performed by communicating a DSA request message and a DSA response message between the wireless device and the base station, wherein at least one of the DSA request message or the DSA response message includes a first parameter indicating whether at least one of the wireless device or the base station support a persistent scheduling allocation, wherein at least one of the DSA request message or the DSA response message includes a second parameter indicating whether at least one of the wireless device or the base station supports an autonomous allocation and deallocation for the resources allocated by the persistent scheduling allocation, and wherein the second parameter is represented by a bitmap format;

receiving, by the wireless device from the base station, an allocation message for allocating persistent scheduling resources used in persistent scheduling, the wireless device making a transition between Low Power Consumption (LPC) mode and active mode;

communicating with the base station, by the wireless device, using the persistent scheduling resources, for active duration in which the wireless device operates in the active mode; and deallocating the persistent scheduling resources automatically when the active duration is finished, wherein the wireless device is a Machine Type Communication (MTC) device for MTC.

2. The method of claim 1, further comprising:

negotiating with the base station, by the wireless device, whether the persistent scheduling resources are automatically deallocated or not.

3. The method of claim 1, wherein the persistent scheduling resources include information about an allocation period indicating a period of the persistent scheduling.

4. The method of claim 3, wherein the allocation message further includes information indicating a period in which the persistent scheduling resources are valid within the active duration.

5. The method of claim 4, wherein the allocation message includes group identifier (ID) indicating an MTC group in which the MTC device is included.

6. The method of claim 1, further comprising:

making a transition, by the wireless device, to the LPC mode when the persistent scheduling resources are automatically deallocated.

7. The method of claim 6, further comprising:

making a transition, by the wireless device, from the LPC mode to the active mode to allocate the persistent scheduling resources automatically.

8. The method of claim 7, further comprising:

negotiating with the base station, by the wireless device, whether the persistent scheduling resources are automatically allocated or not.

9. A wireless device for allocating resources In a wireless communication system, comprising:

a Radio Frequency (RF) unit configured to transmit and receive radio signals; and a processor connected to the RF unit and configured to make a transition between Low Power Consumption (LPC) mode and active mode, wherein the processor is further configured to enter into a base station by performing a downlink channel scanning and an uplink channel scanning, a synchronization with the base station, and a procedure of calculating a transmission parameter for a downlink channel and an uplink channel;

generate a persistent service flow through a dynamic service addition (DSA) procedure, wherein the DSA procedure is performed by communicating a DSA request message and a DSA response message between the wireless device and the base station, wherein at least one of the DSA request message or the DSA response message includes a first parameter indicating whether at least one of the wireless device or the base station support a persistent scheduling allocation, wherein at least one of the DSA request message or the DSA response message includes a second parameter indicating whether at least one of the wireless device or the base station supports an autonomous allocation and deallocation for the resources allocated by the persistent scheduling allocation, and wherein the second parameter is represented by a bitmap format;

receive from the base station an allocation message for allocating persistent scheduling resources used in persistent scheduling;

communicate with the base station using the persistent scheduling resources, for active duration in which the processor operates in the active mode; and deallocate the persistent scheduling resources automatically when the active duration is finished, wherein the wireless device is a Machine Type Communication (MTC) device for MTC.

10. The wireless device of claim 9, wherein the persistent scheduling resources include information about an allocation period indicating a period of the persistent scheduling.

11. The wireless device of claim 10, wherein the allocation message further includes information indicating a period in which the persistent scheduling resources are valid within the active duration.

12. The wireless device of claim 9, wherein the processor makes a transition to the LPC mode when the persistent scheduling resources are automatically deallocated.

* * * * *